UNITED STATES PATENT OFFICE.

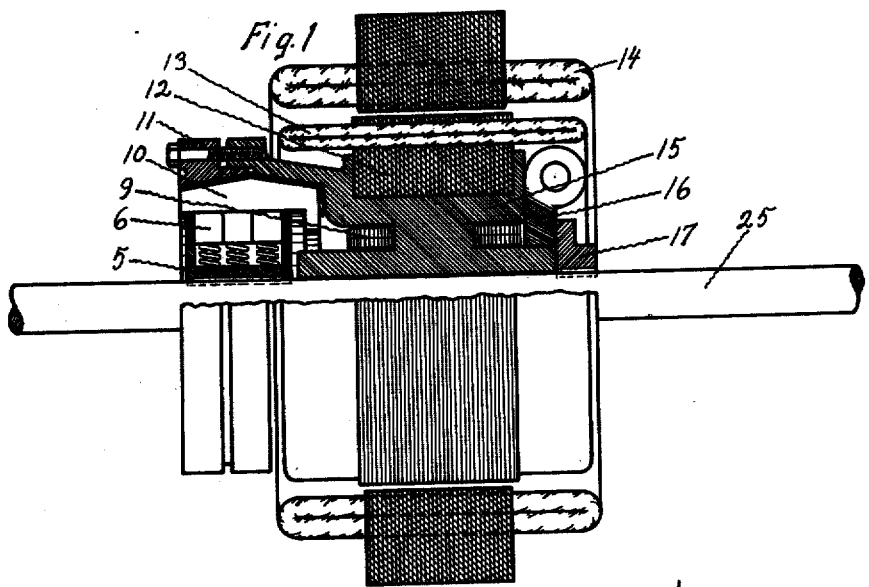
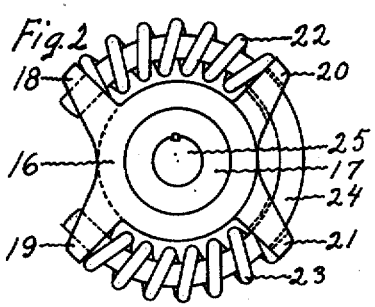
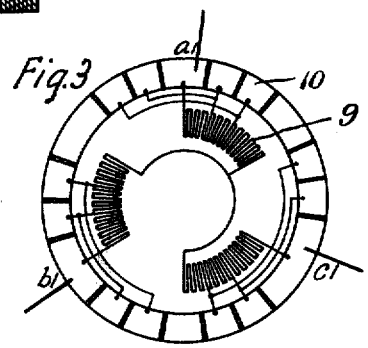
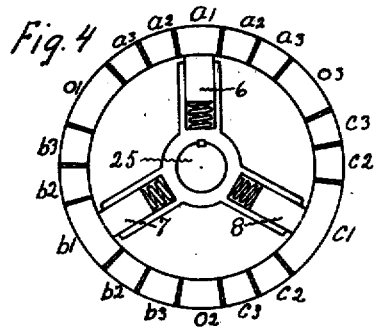
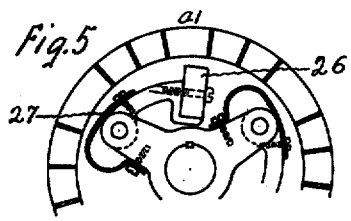
Inventors
Robert H. Pool.
Grover A. Hughes.

ROBERT H. POOL AND GROVER A. HUGHES, OF YOUNGSTOWN, OHIO.

INDUCTION-MOTOR.

1,322,264.　　　Specification of Letters Patent.　　Patented Nov. 18, 1919.

Application filed July 10, 1917. Serial No. 179,654.

*To all whom it may concern:*

Be it known that we, ROBERT H. POOL and GROVER A. HUGHES, citizens of the United States of America, and residing at Youngstown, county of Mahoning, State of Ohio, have invented certain new and useful Improvements in Induction-Motors, of which the following is a specification.

Our invention relates to alternating current motors of the induction type.

The object of our invention is to construct such motors with novel and simple means for automatically regulating the primary current and the torque exerted by the rotating element in response to the torque exerted by the rotating element.

Another object of our invention is to construct such motors so that they will automatically respond to the overloads of short duration with an increased torque, and at the same time limiting the primary current of the motor. Thus it is especially applicable to any machine where an overload of short duration is a part of the cycle of operation, or where such overloads are liable to occur.

In carrying out our invention we use a secondary winding of the ordinary type, carried on a core of laminated magnetic material which turns freely on the shaft of the motor.

The secondary winding and core are held to their position on the shaft by means of a torque responsive device as shown in the accompanying drawings.

The secondary leads are connected to contact bars set in cylindrical form, with an interior or radial contact surface, and are short circuited by means of brushes making contact with the interior or radial surface of the bars.

The brush holder is rigidly secured to the shaft of the motor. A resistance winding mounted in the rotating element is connected to the contact bars in such a manner that, when the torque exerted changes the position of the brushes, the resistance is inserted in the secondary circuit of the motor.

The secondary circuit of an induction motor should possess a relatively high resistance in order to produce a satisfactory starting, accelerating, and overload torque, but should possess a relatively low resistance for satisfactory normal operating characteristics. Numerous constructions of secondary elements have heretofore been devised for imparting to the winding a relatively high effective resistance during the starting and accelerating speeds of the motor, and a relatively low effective resistance when the motor reaches near full load speed. Our invention contemplates improved and novel means for automatically varying with the torque of the motor the effective resistance of the secondary winding, thus improving the operating characteristics of the motor during overload periods as well as during starting and accelerating periods.

The accompanying drawings set forth the nature of our invention and some of the forms of construction which may be employed.

Figure 1 is a diagrammatic sectional view of an induction motor embodying the feature of our invention. Fig. 2 is a diagrammatic view of the torque responsive device. Fig. 3 is a diagram showing form of assembled contact segments and connection of internal resistance thereto. Fig. 4 is a diagrammatic view of the short circuiting device in its normal position with reference to the contact bars. Fig. 5 is a fragmental view showing a form of brush arm construction of centrifugal type.

In Fig. 1 of the drawings we have illustrated our invention embodied in an induction motor of the phase wound secondary type. The working currents of the motor are induced in the secondary winding 13 by a primary or inducing winding 14. The several leads of the secondary winding are connected to the segments $a^1$, $b^1$, $c^1$, of Fig. 3. The segments are assembled as shown in Figs. 3 and 4 in cylindrical form with an interior contact surface. These segments are held in position by an extension of the rotor frame 15 forming a seat, and the ring 11 secured to the frame extension.

The secondary winding 13 is mounted on a core of laminated magnetic material 12 rigidly secured to the casting or equivalent 15 which is rotatably mounted on a rotatably mounted shaft 25.

To casting 15 is rigidly secured the member 16 which is a part of the torque controlled regulating device. Another member of this device 17 is rigidly secured to the shaft 25.

The casting 15 is thus held to a partial rotation on the shaft by the springs 22 and 23 as shown in Fig. 2.

The brush holder 5 carrying the short circuiting brushes 6, 7 and 8 is rigidly secured to the shaft 25. The resistance 9 is mounted in the rotor frame and connected to the segments as shown in Fig. 3.

In Fig. 2 of our drawings we have illustrated the torque responsive device which holds the secondary winding and its adjuncts to a partial rotation on the shaft. The arms 18 and 19 which are a part of member 16 are arranged so that their centers will align with the centers of the arms 20 and 21 which are a part of member 17. The two ends of the open ring 24 are rigidly secured in the arms 18 and 19 and pass freely through the arms 20 and 21 and serve to hold the springs 22 and 23 in their positions between the arms of the members 16 and 17.

Fig. 3 shows the method of assembling the contact segments and the connection thereto of the resistance 9. Fig. 4 shows the short circuiting device consisting of the brush holder 5 and the brushes 6, 7 and 8 and their position with reference to the contact segments when the motor is idle. It will be noted that the segments $a^1$, $b^1$ and $c^1$ are of varied sizes so that no two brushes pass a division at the same time. Fig. 5 shows a form of centrifugal brush in its position when the rotor is at rest, the brush 26 being held away from the contact bars by the spring 27 which also acts as a current carrying shunt. As the rotor acquires speed, the brush is thrown out and held against the bars by centrifugal force, the operation of the motor being then the same as with the brush construction shown in Fig. 4.

The spring pressure between the two members of the torque responsive device is such that at normal load the brushes 6, 7, and 8 still make contact with segments $a^1$, $b^1$, and $c^1$ which are connected respectively to the secondary leads. The secondary winding is thus short circuited through the brushes and brush-holder, and the secondary circuit is of comparatively low resistance as is desired for satisfactory operation at normal and light loads. When the load on the motor increases, the torque exerted compresses the spring 22 or 23 (depending on the direction of rotation) causing the short circuiting brushes to move over the contact segments, first shifting to contact $a^2$ thus cutting into one leg of the secondary circuit a portion of the internal resistance 9. A further increase of torque will break contact with $b^1$, thus inserting resistance into a second leg of the secondary winding. A third step, when the brush breaks contact with $C^1$, inserts resistance into the third leg of the secondary winding. The next step adds resistance in the first leg of the secondary winding as the brush passes from $a^2$ to $a^3$. As the torque is increased, the short circuiting brushes rotate farther on the contact segments, cutting in resistance step by step as the brushes pass from segment to segment, the last step being when the brush passes from $C^3$ to $O^3$, the short circuiting device being out of the circuit and the entire resistance 9 is in the secondary circuit.

In starting, the high torque exerted compresses the spring 22 or 23 and rotates the brushes to their last position. As the rotor comes up to speed and the torque diminishes, the spring gradually forces the rotor back to its normal position, the brushes moving back to their normal position short circuiting the segments $a^1$, $b^1$ and $c^1$. Thus we have the relatively high ohmic resistance in the secondary winding during starting, accelerating and overload periods that is desired for satisfactory operation, and that resistance being automatically varied with the torque exerted.

Obviously, changes may be made in the form and arrangement of the parts without departing from the spirit of our invention, and we do not limit ourselves to the particular construction shown.

Having thus described our invention, what we claim is:—

1. A motor of the alternating current induction type provided with a regulating device, comprising means responsive to the torque of the motor, self contained within the rotating member, whereby the torque of the motor is regulated.

2. In a motor of the alternating current induction type, a rotating member comprising a secondary member of the phase wound type, a self-contained resistance in circuit with said secondary member, and means responsive to the torque whereby said resistance in circuit with the motor is varied.

3. In a motor of the alternating current induction type, the combination with a secondary winding of the phase wound type, of a self-contained resistance in the secondary circuit, a regulating device comprising contact segments mounted in proximity to the secondary winding and connected thereto and means operatively related to said contact segments, for varying said resistance, self contained in the motor and responsive to the torque of the motor.

4. In a motor of the alternating current induction type, the combination with a rotatably mounted shaft, a core of magnetic material mounted thereon, and a secondary winding of the phase wound type on said core, of a regulating device comprising contact segments mounted in proximity to the secondary winding and connected thereto, brushes bearing on said contact segments and mechanical means responsive to the torque of the motor for varying the rotative position of said brushes on said contact segments.

5. In a motor of the alternating current induction type, the combination with a rotatably mounted shaft, a core of magnetic material mounted thereon, and a secondary winding of the phase wound type on said core, of a regulating device comprising contact segments and a resistance mounted in the rotating members, said contact segments being secured to the core and connected to the secondary winding and to the resistance, and brushes secured to the shaft, and means self contained in the rotor and operatively related to said brushes and contact segments for varying in response to the torque of the motor and rotative position of said brushes on said contact segments thereby varying the resistance included in the circuit.

6. In a motor of the alternating current induction type, the combination with a rotatably mounted shaft, a core of magnetic material mounted thereon, and a secondary winding of the phase wound type on said core, of a regulating device comprising contact segments secured to the core and connected to the secondary winding, a resistance which is mounted in the rotating member and is connected to said contact segments, brushes which are secured to the shaft and bear on said contact segments, and mechanical means operatively secured to core and shaft for varying the relative rotation of core and shaft in response and in proportion to the torque of the motor.

In testimony whereof we sign this application.

R. H. POOL.
G. A. HUGHES.

Witnesses:
  HENRY GUGGENHEIM,
  ROY WESTOVER.